(12) United States Patent
Pendakur

(10) Patent No.: US 9,866,918 B2
(45) Date of Patent: *Jan. 9, 2018

(54) WIRELESS ACCESS POINT WITH DIGITAL TELEVISION CAPABILITIES

(71) Applicant: INTEL CORPORATION, Santa Clara, CA (US)

(72) Inventor: Ramesh Pendakur, Gaston, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/812,774

(22) Filed: Jul. 29, 2015

(65) Prior Publication Data

US 2016/0105726 A1  Apr. 14, 2016

Related U.S. Application Data

(63) Continuation of application No. 14/046,088, filed on Oct. 4, 2013, now Pat. No. 9,124,940, which is a
(Continued)

(51) Int. Cl.
| | |
|---|---|
| *H04W 4/00* | (2009.01) |
| *H04N 21/61* | (2011.01) |
| *H04N 21/436* | (2011.01) |
| *H04N 21/4363* | (2011.01) |
| *H04N 21/45* | (2011.01) |
| *H04N 21/454* | (2011.01) |
| *H04N 21/4627* | (2011.01) |

(Continued)

(52) U.S. Cl.
CPC ..... *H04N 21/6106* (2013.01); *H04L 65/1026* (2013.01); *H04L 65/608* (2013.01); *H04N 21/25816* (2013.01); *H04N 21/43615* (2013.01); *H04N 21/43637* (2013.01); *H04N 21/454* (2013.01); *H04N 21/4516* (2013.01); *H04N 21/4627* (2013.01); *H04N 21/482* (2013.01); *H04N 21/61* (2013.01); *H04N 21/85406* (2013.01); *H04W 84/12* (2013.01); *H04W 88/08* (2013.01); *H04W 88/10* (2013.01); *H04L 65/4076* (2013.01)

(58) Field of Classification Search
CPC ......... H04N 21/6106; H04N 21/43615; H04N 21/43637; H04N 21/4516; H04N 21/454; H04N 21/4627; H04N 21/25816; H04N 21/61; H04N 21/482; H04N 21/85406; H04W 88/08; H04W 88/10; H04W 84/12; H04L 65/4076; H04L 65/1026
See application file for complete search history.

(56) References Cited

U.S. PATENT DOCUMENTS

| | | | |
|---|---|---|---|
| 7,698,723 B2 * | 4/2010 | Hicks, III | H04N 5/76 725/142 |
| 8,045,922 B2 | 10/2011 | Sherman et al. | |

(Continued)

FOREIGN PATENT DOCUMENTS

WO     2006/132600 A1    12/2006

*Primary Examiner* — Kevin Mew
(74) *Attorney, Agent, or Firm* — International IP Law Group, P.L.L.C.

(57) ABSTRACT

In some embodiments a wireless access point receives digital television content. The digital television content is transmitted in a wireless manner over a wireless network of the wireless access point. Other embodiments are described and claimed.

24 Claims, 1 Drawing Sheet

Related U.S. Application Data continuation of application No. 12/459,422, filed on Jun. 30, 2009, now Pat. No. 8,576,773.

(51) Int. Cl.

| | | |
|---|---|---|
| *H04W 88/10* | (2009.01) | |
| *H04N 21/258* | (2011.01) | |
| *H04N 21/482* | (2011.01) | |
| *H04N 21/854* | (2011.01) | |
| *H04W 84/12* | (2009.01) | |
| *H04W 88/08* | (2009.01) | |
| *H04L 29/06* | (2006.01) | |

(56) References Cited

U.S. PATENT DOCUMENTS

| | | | |
|---|---|---|---|
| 8,576,773 B2 | 11/2013 | Pendakur | |
| 8,631,450 B1 | 1/2014 | Bernath et al. | |
| 8,681,707 B2 * | 3/2014 | Kesselman | H04W 72/085 |
| | | | 370/318 |
| 9,124,940 B2 | 9/2015 | Pendakur | |
| 2005/0125830 A1 * | 6/2005 | Halttunen | H04H 60/80 |
| | | | 725/81 |
| 2005/0155077 A1 * | 7/2005 | Lawrence | H04N 21/4113 |
| | | | 725/109 |
| 2005/0216949 A1 * | 9/2005 | Candelora | H04N 21/2182 |
| | | | 725/134 |
| 2006/0041916 A1 * | 2/2006 | McQuaide, Jr. | H04M 15/06 |
| | | | 725/81 |
| 2006/0078281 A1 * | 4/2006 | Chiba | H04N 5/765 |
| | | | 386/247 |
| 2006/0240947 A1 | 10/2006 | Qu | |
| 2007/0079339 A1 | 4/2007 | Hanabusa | |
| 2007/0091168 A1 * | 4/2007 | Lee | H04N 7/163 |
| | | | 348/14.01 |
| 2007/0162981 A1 | 7/2007 | Morioka et al. | |
| 2007/0180485 A1 * | 8/2007 | Dua | H04L 29/06027 |
| | | | 725/114 |
| 2007/0214484 A1 | 9/2007 | Taylor et al. | |
| 2007/0250870 A1 | 10/2007 | Kim et al. | |
| 2007/0250872 A1 * | 10/2007 | Dua | H04N 7/163 |
| | | | 725/81 |
| 2007/0288967 A1 * | 12/2007 | Candelore | H04N 5/913 |
| | | | 725/50 |
| 2007/0300255 A1 * | 12/2007 | Londero | H04N 5/44543 |
| | | | 725/42 |
| 2008/0092200 A1 | 4/2008 | Grady et al. | |
| 2008/0141296 A1 | 6/2008 | Yoon | |
| 2008/0198801 A1 | 8/2008 | Kesselman et al. | |
| 2008/0261514 A1 * | 10/2008 | Pratt | H04H 20/57 |
| | | | 455/3.06 |
| 2008/0320543 A1 | 12/2008 | Wang et al. | |
| 2009/0063691 A1 | 3/2009 | Kalofonos et al. | |
| 2009/0080860 A1 * | 3/2009 | Nakano | H04N 5/44508 |
| | | | 386/241 |
| 2009/0089711 A1 * | 4/2009 | Dunton | G06F 17/30265 |
| | | | 715/838 |
| 2009/0220209 A1 | 9/2009 | Mori | |
| 2009/0233545 A1 | 9/2009 | Sutskover et al. | |
| 2009/0252329 A1 | 10/2009 | Casey et al. | |
| 2010/0020746 A1 | 1/2010 | Zaks | |
| 2010/0031299 A1 * | 2/2010 | Harrang | H04N 21/4104 |
| | | | 725/80 |
| 2010/0083338 A1 * | 4/2010 | Chiang | H04N 5/4403 |
| | | | 725/139 |
| 2010/0215021 A1 | 8/2010 | Li et al. | |
| 2011/0197246 A1 * | 8/2011 | Stancato | H04L 65/4076 |
| | | | 725/111 |
| 2012/0099025 A1 * | 4/2012 | Kanda | H04L 12/2827 |
| | | | 348/734 |
| 2013/0067509 A1 * | 3/2013 | Talbert | H04N 21/43615 |
| | | | 725/31 |
| 2013/0275615 A1 * | 10/2013 | Oyman | H04L 65/60 |
| | | | 709/231 |
| 2015/0172757 A1 * | 6/2015 | Kafle | H04L 67/1044 |
| | | | 725/81 |

\* cited by examiner

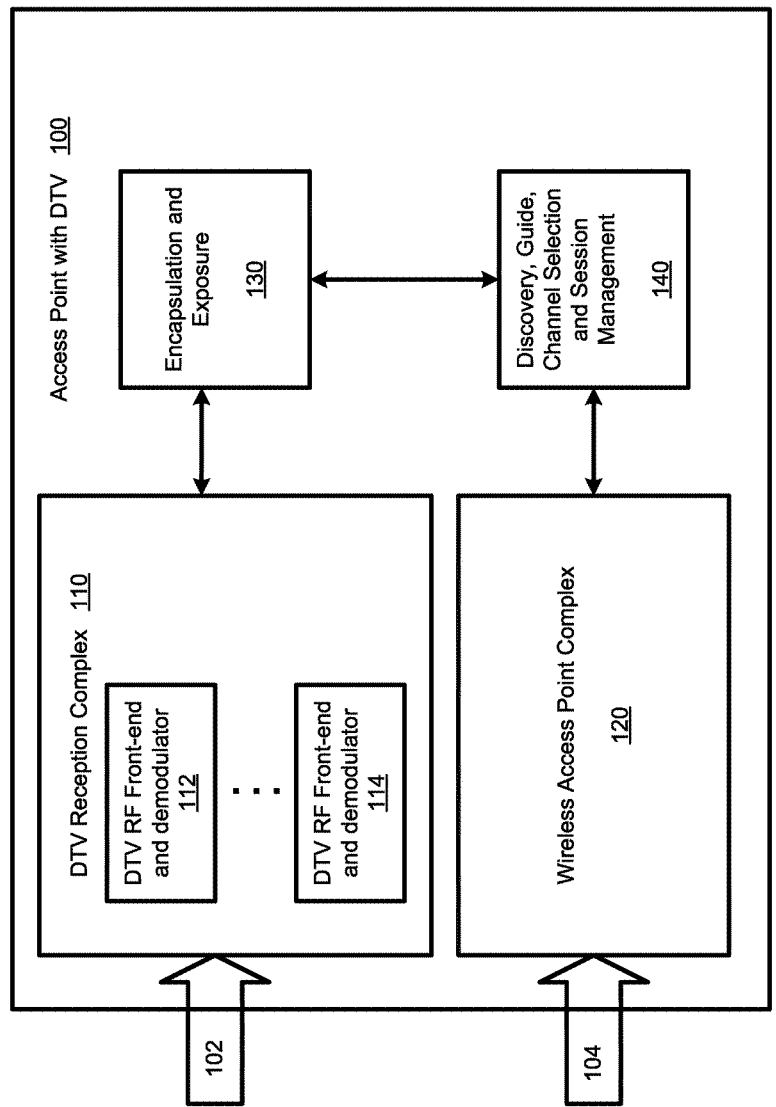

though DTV antenna 102 and wireless antenna 104 could be in some embodiments each a single antenna, in some embodiments one or both of antennas 102 and 104 could be an antenna complex. For example, DTV antenna 102 is in some embodiments a DTV antenna complex (for example, with a separate antenna for each DTV receiver), and/or in some embodiments DTV 102 is several antennas. Similarly, wireless antenna 104 is in some embodiments a wireless antenna complex, and/or in some embodiments wireless antenna 104 is several antennas. Wireless AP 100 further includes a DTV reception complex 110, a wireless AP complex such as a Wi-Fi AP complex 120, encapsulation and exposure module 130, and discovery, DTV guide, channel selection and session management module 140. In some embodiments, the access point 100 is a home access point, a public access point, and/or some other type of access point.

WIRELESS ACCESS POINT WITH DIGITAL TELEVISION CAPABILITIES

RELATED APPLICATION

This application is a continuation of and claims priority to U.S. patent application Ser. No. 14/046,088 titled "WIRELESS ACCESS POINT WITH DIGITAL TELEVISION CAPABILITIES," which was filed on Oct. 4, 2013; which is a continuation of U.S. patent application Ser. No. 12/459,422 filed Jun. 30, 2009 which is now U.S. Pat. No. 8,576,773 issued Nov. 5, 2013, these applications are entirely incorporated by reference.

TECHNICAL FIELD

The inventions generally relate to a wireless access point with digital television capabilities.

BACKGROUND

Some Personal Computers (PCs) such as laptops, notebooks, desktops, nettops, netbooks, or Mobile Internet Devices (MIDs), for example, are available that receive digital television (DTV) signals. However, these systems typically need to incorporate digital television (DTV) silicon, hardware and/or software such as a radio front-end, a demodulator, a host interface chip, and software. Current solutions provide discrete DTV silicon integration in each platform. If both indoor and outdoor reception is implemented, the bill of material (BOM) cost for each platform added to the cost of the platform is significant (for example, $20 per platform). Additionally, in most currently available systems, only one channel may be viewed at a time.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

FIG. 1 illustrates a system according to some embodiments of the inventions.

DETAILED DESCRIPTION

Some embodiments of the inventions relate to a wireless access point with digital television capabilities. In particular, some embodiments of the inventions relate to a wireless access point with terrestrial digital television capabilities.

In some embodiments a wireless access point receives digital television content. The digital television content is transmitted in a wireless manner over a wireless network of the wireless access point.

FIG. 1 illustrates a wireless access point (wireless AP) 100 according to some embodiments. In some embodiments, wireless AP 100 includes a digital television (DTV) antenna 102 (for example, a terrestrial digital television antenna) and a wireless antenna 104 (for example, a Wi-Fi antenna, an ultra-wideband antenna, and/or any other type of wireless antenna). Although DTV antenna 102 and wireless antenna 104 could be in some embodiments each a single antenna, in some embodiments one or both of antennas 102 and 104 could be an antenna complex. For example, DTV antenna 102 is in some embodiments a DTV antenna complex (for DTV receiver complex 110 includes one or more DTV radio frequency (RF) front-end and demodulator modules (for example 112 and 114) including, for example, a host interface. Although two DTV RF front-end and demodulator modules 112 and 114 are illustrated in FIG. 1, it is noticed that any number of one or more modules may be included according to some embodiments. Each of the modules 112 and 114 receives, demodulates, and delivers, for example, a single DTV channel complex (for example, an 8 Mhz DTV channel in an Advanced Television Systems Committee or ATSC network, or in a Digital Video Broadcast or DVB network). Within that one physical channel, a number of logical programs are available for viewing according to some embodiments. If the receiver complex 100 has more than one channel receiver 112, 114, etc. then within a single wireless hotspot, simultaneous access to multiple DTV channels is enabled. If a number of users are present and actively viewing DTV programming content, a number of concurrent different channels can be viewed (for example, depending on the number of DTV receivers 112, 114, etc. in the receiver complex 110).

In some embodiments, a user on a computing platform wirelessly coupled to the wireless access point 100 has previously installed on that platform a viewer software stack, for example, and can associate it with the type of stream. In some embodiments, such a user chooses a Uniform Resource Locator (URL) or web site that points to a web server that is running inside the access point 100, for example. In some embodiments, this web server is performing the discovery, DTV guide, channel selection and session management module 140, for example. The server serves up the DTV guide, channel selection capability and other info to users of platforms coupled to the access point 100. The users select a channel of interest to launch an associated viewer application to receive Real-time Transport Protocol (RTP) sessions, for example. The DTV receiver complex 110 and/or a particular one of the DTV receivers 112, 114, etc. tune, demodulate, and pass video content (for example, MPEG-2 Transport Stream or MPEG-2 TS) to the encapsulation and exposure module 130 so that an RTP session is created with this Transport Stream (TS). In some embodiments, a typical TS could have, for example, up to 19 Mbps data.

For example, in some embodiments, the encapsulation and exposure module 130 is system software used to encapsulate DTV streams (for example, MPEG-2 TS streams) into RTP sessions and expose them through a dynamically discoverable protocol endpoint (for example, a Universal Plug and Play or uPNP end-point). In a wireless network such as a Wi-Fi IEEE 802.11n network, for example, multiple simultaneous RTP sessions are supported from multiple DTV sessions. In some embodiments, the bandwidth is dependent on the link bandwidth of the wireless network (for example, the Wi-Fi network).

Since current computing platforms currently incorporate broadband wireless silicon (for example, Wi-Fi IEEE 802.11a, 802.11b, 802.11g, 802.11n) with very high attach rates, the wireless access point 100 adds DTV capabilities within the access point rather than requiring inclusion of this capability within every computing platform. Wireless access point 100 re-uses the wireless silicon (for example, the Wi-Fi silicon) to receive a DTV signal. According to some embodiments, the DTV device can be discrete, and in other embodiments such as illustrated in FIG. 1, the DTV device is incorporated within the access point. In any case, DTV signals are received and transcoded into signals that can be transmitted and received on wireless networks such as, for example, Wi-Fi networks, and the wireless network can be used to redistribute the DTV content (for example, in wireless hotspots such as Wi-Fi hotspots). Existing platforms do not need additional hardware changes and extra costs associated with adding the DTV hardware to each platform. Additional software such as system software is added to perform the functions, for example, of encapsulating DTV streams (such as, for example, DTV MPEG-2 TS streams) into RTP sessions and exposing them through a dynamically discoverable protocol (for example, uPNP endpoints) in order to receive and process the DTV bit-stream over the wireless network (for example, using module 130, which in some embodiments is implemented using system software).

In some embodiments, a wireless access point (for example, a Wi-Fi access point) is used to create a DTV hotspot. Such an access point saves on complexity, cost, and integration headaches for each individual platform on which a user wants to view DTV content. Further, thin and clean industrial designs are possible for each of the platforms that avoid the necessity of integrating additional and/or multiple radios, antennas, etc.

In some embodiments, wireless access point 100 includes, for example, a hard drive or some other type of storage device. In some embodiments the storage device stores digital television content which is recorded therein by the access point 100 for later playback (for example, when a user wishes to later view the content recorded in the access point over a device connected via the wireless network of the wireless access point). In some embodiments, a guide feature includes mixture of control of recorded and live content in the guide. In some embodiments, the discovery, DTV guide, channel selection and session management module 140 includes mixture of recorded and live content.

In some embodiments, a user of a platform can record one DTV channel and view another at the same time. According to some embodiments, cost is minimized and a user is able to simply use an existing web browser to discover, select and view DTV content. Additionally, in some embodiments, a wireless access point such as wireless access point 100 may be used to multicast DTV streams, allowing for an efficient use of the bandwidth of the wireless network (for example, of a Wi-Fi network). According to some embodiments, a wireless hotspot ends up also being a DTV hotspot. As a result, numerous devices may be essentially converted into DTV receivers without the addition of the DTV hardware to each of those devices. Content is carried on a wireless network (such as, for example, a Wi-Fi network), and existing wireless usage models at home and public locations may be built upon accordingly.

Some embodiments relate to over the air digital television (for example, worldwide uses of terrestrial digital television).

In some embodiments, a wireless access point such as access point 100 is included in a home networking environment, a public networking environment, and/or some other type of networking environment.

In some embodiments, the entire access point (for example, wireless access point 100) is integrated into another device (for example, into a television set). In some embodiments, the other device (such as a television set) allows for digital television reception as well as a redistribution capability, and/or any other capabilities described herein.

In some embodiments, additional wireless control and content protection is included. For example, in addition to normal wireless networking control for entry to the wireless network, in some embodiments further control is included in order for a user of a device coupled to the wireless network to receive additional services such as receipt of digital television content from the wireless access point. For example, in some embodiments, each of the nodes attached to an access point are authenticated as part of the normal wireless access point functionality in order for a user to obtain wireless network access. Further, additional authentication and encryption is added according to some embodiments. In some embodiments, a given endpoint is authorized for a given service. For example, authorization and encryption may be necessary for additional service level, payment for additional service, and/or due to legal, copyright issues as well. In some embodiments, content protection is added where one or more receiver devices on the wireless network are first authenticated, and the access point then has the ability to set up a secure encrypted session with the receiver device(s) in order to securely transmit the content. In this manner, each device must prove that it is an authenticated device, and then given a session key to use in order to receive the encrypted content.

In some embodiments, a unicast mode is implemented where content is individually transmitted to a device. For example, independent streams are transmitted to each independent device. In some embodiments, a multicast mode is implemented where a common stream is transmitted to multiple devices at the same time.

Although some embodiments have been described herein as being performed on a wireless access point, according to some embodiments these particular implementations may not be required. For example, a DTV device may be implemented according to some embodiments that is not included in a wireless access point. Similarly, although some embodiments have been described herein as being related to Wi-Fi, 802.11, and/or ultra-wideband wireless technologies, according to some embodiments these particular implementations may not be required. For example, some embodiments relate to other types of technologies. For example, some embodiments of the present inventions may be implemented with future wireless technologies such as any future generation wireless network, for example.

Although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a FIGURE, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive signals, etc.), and others.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A device to establish a wireless hotspot to redistribute digital television content, comprising:
   a digital television receiver to receive a terrestrial broadcast of digital television content; and
   encapsulation and exposure circuitry to transcode the digital television content into a Real-time Transport Protocol (RTP) session;
   a transmitter to wirelessly stream the digital television content to a smart device over a Wi-Fi network to be generated by the wireless hotspot; wherein the wireless hotspot redistributes the digital television content through the RTP session and does not include a display for rendering the digital television content.

2. The device of claim 1, wherein the digital television content is MPEG encoded, the wireless hotspot comprising a digital television tuner to decode the MPEG encoded digital television content before streaming the digital television content to the smart device.

3. The device of claim 1, comprising a management device to generate a program guide and transmit the program guide to an application that resides on the smart device.

4. The device of claim 1, comprising a storage device to record the digital television content for later streaming.

5. The device of claim 1, comprising an Radio Frequency (RF) antenna coupled to the digital television receiver to receive the terrestrial broadcast.

6. The device of claim 1, wherein the smart device is a laptop computer.

7. The device of claim 1, wherein the smart device is a mobile phone.

8. The device of claim 1, wherein the smart device is a tablet computer.

9. A method of redistributing digital television content, comprising:
   receiving a terrestrial broadcast of digital television content at a wireless hotspot;
   transcoding the digital television content into a Real-time Transport Protocol (RTP) session; and
   streaming the digital television content to a smart device over a Wi-Fi network generated by the wireless hotspot;
   wherein the wireless hotspot redistributes the digital television content through the RTP session does not include a display for rendering the digital television content.

10. The method of claim 9, wherein the digital television content is MPEG encoded, the method comprising decoding the MPEG encoded digital television content before streaming the digital television content to the smart device.

11. The method of claim 9, comprising generating a program guide and transmitting the program guide to an application that resides on the smart device.

12. The method of claim 9, comprising recording the digital television content to a storage device of the wireless hotspot for later streaming.

13. The method of claim 9, wherein the wireless hotspot comprises a Radio Frequency (RF) antenna to receive the terrestrial broadcast.

14. The method of claim 9, wherein the smart device is a laptop computer.

15. The method of claim 9, wherein the smart device is a mobile phone.

16. The method of claim 9, wherein the smart device is a tablet computer.

17. A non-transitory computer-readable medium comprising instructions that when executed cause a wireless hotspot to:
    receive a terrestrial broadcast of digital television content at the wireless hotspot;
    transcode the digital television content into a Real-time Transport Protocol (RTP) session; and
    stream the digital television content to a smart device over a Wi-Fi network generated by the wireless hotspot;
    wherein the wireless hotspot redistributes the digital television content through the RTP session and does not include a display for rendering the digital television content.

18. The computer-readable medium of claim 17, wherein the digital television content is MPEG encoded, the computer-readable medium comprising instructions that cause the wireless hotspot to decode the MPEG encoded digital television content before streaming the digital television content to the smart device.

19. The computer-readable medium of claim 17, comprising instructions that cause the wireless hotspot to generate a program guide and transmit the program guide to an application that resides on the smart device.

20. The computer-readable medium of claim 17, comprising instructions that cause the wireless hotspot to record the digital television content to a storage device of the wireless hotspot for later streaming.

21. The computer-readable medium of claim 17, wherein the wireless hotspot comprises a Radio Frequency (RF) antenna to receive the terrestrial broadcast.

22. The computer-readable medium of claim 17, wherein the smart device is a laptop computer.

23. The computer-readable medium of claim 17, wherein the smart device is a mobile phone.

24. The computer-readable medium of claim 17, wherein the smart device is a tablet computer.

\* \* \* \* \*